United States Patent [19]

Sandler

[11] 4,208,322

[45] Jun. 17, 1980

[54] POLYESTER-POLYAMIDE RESINS FLAME RETARDED BY POLY(METAL PHOSPHINATE)S

[75] Inventor: Stanley R. Sandler, Springfield, Del.

[73] Assignee: Pennwalt Corporation, Philadelphia, Pa.

[21] Appl. No.: 34,092

[22] Filed: Apr. 27, 1979

Related U.S. Application Data

[62] Division of Ser. No. 895,839, Apr. 13, 1978.

[51] Int. Cl.$^2$ .......................... C08K 5/53; C08L 77/12
[52] U.S. Cl. ...................... 260/45.75 K; 260/45.75 B; 260/45.75 C; 260/45.75 F; 260/45.75 G; 260/45.75 N; 260/45.75 P; 260/45.75 V; 260/45.75 W; 525/419; 525/420; 528/292
[58] Field of Search ...................... 260/45.75; 525/419, 525/420; 528/292

[56] References Cited

U.S. PATENT DOCUMENTS

| | | | |
|---|---|---|---|
| 3,594,347 | 7/1971 | Lazarus et al. | 260/45.75 R |
| 3,786,114 | 1/1974 | Jaquiss et al. | 260/860 |
| 3,847,873 | 11/1974 | Jackson et al. | 528/287 |
| 3,849,380 | 11/1974 | Jackson et al. | 528/286 |
| 3,900,444 | 8/1975 | Racky et al. | 260/45.75 P |
| 3,907,754 | 9/1975 | Tershansy et al. | 528/286 |
| 4,049,612 | 9/1977 | Sandler | 260/31.8 R |

*Primary Examiner*—Lucille M. Phynes
*Attorney, Agent, or Firm*—R. G. Danehower

[57] ABSTRACT

Polyesters, polyamides and polyester-polyamides are flame retarded by incorporating a flame retardant amount of selected poly(metal phosphinate)s with the resins. The poly(metal phosphinate)s can be incorporated with the resins either by admixture of the poly(metal phosphinate)s with the polyester or polyamide or by adding the poly(metal phosphinate)s to the polyester or polyamide polymerization reaction whereby the poly(metal phosphinate)s become a part of the polymer structure.

8 Claims, No Drawings

POLYESTER-POLYAMIDE RESINS FLAME RETARDED BY POLY(METAL PHOSPHINATE)S

This is a division of application Ser. No. 895,839 filed Apr. 13, 1978.

STATEMENT OF THE INVENTION

This invention is directed to flame retarded polyester, polyamide or polyester-polyamide compositions containing flame retardant amounts of one or more selected poly(metal phosphinate)s.

BACKGROUND OF THE INVENTION

U.S. Pat. No. 3,900,444 describes the use of alkali salts of phosphinic or diphosphinic acids to flame retard saturated polyesters. These compounds have the serious disadvantage of being water soluble thus making the resulting compositions susceptable to a loss of flame retardancy in an aqueous environment such as in laundering of fabrics prepared from these polyester compositions. U.S. Pat. No. 3,786,114 describes the use of barium or cadmium salts of either phenylphosphinic acid or a mono or diphenylphosphoric acids for use as flame retardant additives for polycarbonate resins. The phenylphosphinic acid salts have the disadvantage of being oxidatively unstable and will lose their flame retardancy over a period of time. The diphenylphosphoric acid compounds could produce an acidic condition which would irritate the skin.

U.S. Pat. No. 4,049,612 discloses that poly(metal phosphinate)s are useful as smoke retardants for polyvinyl chloride resins and suggests their use as flame retardants for polymers such as polyester and nylon.

DESCRIPTION OF THE INVENTION

I have now discovered that selected poly(metal phosphinate)s are useful for imparting flame retardant properties to polyester resins, polyamide resins and mixed polyester-polyamide resins.

The poly(metal phosphinate)s used in preparing the flame retardant compositions of this invention overcome the disadvantages of the prior art flame retardant additives in that my disubstituted phosphinate (R or $R_1$ cannot be hydrogen) compositions are oxidatively more stable in the atmosphere than the monosubstituted phosphinates of the prior art and are insoluble in water. The poly(metal phosphinate)s useful in my invention are also of low volatility which insures good processing of the flame retardant resin compositions into fabrics, fibers or articles made by molding or extruding. These flame retardant compositions can be used in any area where a polyester or polyamide is needed which is less flammable than the original untreated resin material. The mechanism by which the poly(metal phosphinate)s achieve flame retardation is not known.

Poly(metal phosphinate)s have been described in the literature [B. P. Block, Inorganic Macromolecular Reviews 1, pp 115-125 (1970] and typically in U.S. Pat. Nos. 3,197,436; 3,255,125; 3,415,762 and the polymer and solubility properties given. These references describing the poly(metal phosphinate)s and their preparation are incorporated herein by reference.

The poly(metal phosphinate)s used in this invention are oligomeric or polymeric species with one, two, three, or four phosphinate groups per coordination center. The following are the general types of compositions:

(a) One phosphinate per center: MX, MaX, $Ma_2X$, $Ma_3X$, M(AA)X, $M(AA)_2X$;

(b) Two phosphinates per center; $MX_2$, $MaX_2$, $Ma_2X_2$, $MabX_2$, $M(AA)X_2$;

(c) Three phosphinates per center, $MX_3$, $MaX_3$, $Ma_2X_3$, $MabX_3$, $M(AA)X_3$;

(d) Four phosphinates per center, $MX_4$.

In these formulas: M is a metal selected from the group consisting of beryllium, magnesium, calcium, strontium, barium, titanium, zirconium, vanadium, antimony, bismuth, chromium, molybdenum, tungsten, manganese, iron, ruthenium, cobalt, rhodium, iridium, nickel, palladium, platinum, copper, silver, zinc, cadmium, mercury, aluminum, tin, lead, and mixtures thereof;

X is a disubstituted phosphinate group having the structure

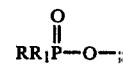

wherein

R and $R_1$ are independently selected from (i) an aliphatic group of 1 to 20 carbons with the preferred being linear or branched alkyl of 1 to 12 carbons such as methyl, butyl, octyl or dodecyl, (ii) a cycloaliphatic group of 3 to 20 carbons such as cyclopropyl, cyclohexyl, cyclooctyl, or (iii) an aromatic group of 6 to 12 carbons such as phenyl, methylphenyl, t-butyl phenyl or naphthyl. Each of the above definitions of R and $R_1$ can optionally have substitutions thereon such as a halogen (F, Cl, Br, I), ether, hydroxyl, ketone or ester; and, a and b are unidentate groups such as oxy, alkoxy, hydroxyl or halide; and AA is a bidentate ligand such as acetylacetonate, picolinate, 8-hydroxyquinolinate, dimethylglyoximate and glycinate.

Poly(metal phosphinate)s may be prepared [see S. H. Rose and B. P. Block, J.A.C.S. 87 2076 (1965)] by the following reaction as illustrated with cobalt acetate starting material.

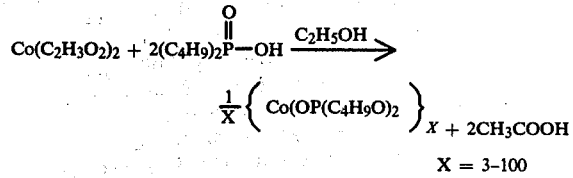

Examples of the four general types of poly(metal phosphinate)s are as follows:

| | Degree of polymerization |
|---|---|
| (a) One phosphinate per center: | |
| $Al[(CH_3)_2PO_2](OC_3H_7)_2$ | 3 |
| $Sn[(C_6H_5)_2PO_2](CH_3)_3$ | 4 |
| (b) Two phosphinates per center: | |
| $Co\ [(CH_3)C_6H_5PO_2\ ]_2$ | >30 |
| $Ti\ [(C_6H_5)_2PO_2]_2O$ | >20 |
| $Zn[(C_4H_9)_2PO_2]_2$ | >25 |
| $Cr\ [(C_6H_5)_2PO_2]_2OH$ | >100 |
| (c) Three phosphinates per center: | |
| $Cr\ [(C_6H_5)_2PO_2]_3$ | >100 |
| $Al[(C_4H_9)(C_6H_5CH_2)PO_2](C_8H_{17})_2PO_2]_2$ | 560 |
| (d) Four phosphinates per center: | |

| | Degree of polymerization |
|---|---|
| Ti[(C$_6$H$_5$)$_2$PO$_2$]$_4$ | 3 |

Preferred poly(metal phosphinate)s are those based on copper, iron, tin, cobalt, tungsten, manganese, chromium, vanadium, titanium, zinc, cadmium and molybdenum. Especially preferred poly(metal phosphinate)s are those based on zinc.

The use of poly(metal phosphinate)s containing mixtures of metals in the network, mixtures of poly(metal phosphinate)s, and poly(metal phosphinate)s with one or more types of phosphinic acid groups per metal, are also a part of my invention.

Phosphinic acids

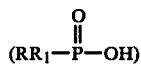

that can be used in making poly(metal phosphinate)s are as previously described. Representative examples are:
1. Di(n-butyl)phosphinic acid,
2. Di(t-butyl)phosphinic acid,
3. Dimethylphosphinic acid,
4. Methylphenylphosphinic acid,
5. Dioctylphosphinic acid,
6. Diphenylphosphinic acid,
7. Dicyclohexylphosphinic acid,
8. Bis(chlorethyl)phosphinic acid,
9. Bis(phenylhydroxymethyl) phosphinic acid,
10. Phenyl-(hydroxymethyl) phosphinic acid,
11. Perfluoroalkylethyl-(phenyl) phosphinic acid, (where the perfluoroalkyl group is a linear, cyclic or branched group of 1–20 carbons),
12. Bis(trichlorohydroxyethyl)phosphinic acid,
13. Bis(tribromophenyl)phosphinic acid,
14. Bis(trichlorophenyl)phosphinic acid,
15. Bis(hydroxybutyl)phosphinic acid,
16. Bis(tribromohydroxyethyl)phosphinic acid,
17. Bis(2-propanoyl)phosphinic acid,
18. Bis(methylcarboxyoctyl)phosphinic acid,
19. Bis(pentafluorocyclohexyl)phosphinic acid,
20. Bis(hydroxymethylfurfuryl)phosphinic acid,
21. Bis(methoxyphenyl)phosphinic acid,
22. Bis(methylcarboxyphenyl)phosphinic acid,
23. Bis(hydroxyphenyl)phosphinic acid,
24. Bis(phenoxyphenyl)phosphinic acid,
25. Bis(iodophenyl)phosphinic acid,
26. Bis(iodopropyl)phosphinic acid,
27. Phenyl-(hydroxycyclohexyl)phosphinic acid,
28. Bis(hydroxymethyl)phosphinic acid, and
29. Bis(hydroxyethyl)phosphinic acid.

Especially preferred examples are the dialkyl, alkylaryl, and diaryl phosphinic acids, as for example:
1. Bis(hydroxymethyl)phosphinic acid,
2. Bis(hydroxyethyl)phosphinic acid,
3. Dibutylphosphinic acid,
4. Dioctylphosphinic acid,
5. Diphenylphosphinic acid,
6. Methylphenylphosphinic acid,
7. Phenyl(hydroxymethyl)phosphinic acid.

A variety of polyester and polyamide resins are contemplated by this invention including homopolymers, copolymers, and polymer mixtures.

Polyesters applicable in practicing this invention include those which are well-known in the art as exemplified by U.S. Pat. Nos.: 2,465,319; 2,744,087; 2,744,089; 3,277,680; 3,335,209; 3,406,152; 3,412,073; 3,475,381; 3,476,715; 3,489,722; Brit. Pat. Nos. 793,907; 678,264; 578,079; Belg. Pat. No. 614,457, and those compositions described in the chapter on polyesters in the text: S. R. Sandler and W. Karo, *Polymer Syntheses*-Vol. I, Academic Press, Inc., New York, 1974. These references to the description and preparation of polyesters are incorporated herein by reference.

The poly(metal phosphinate)s can be incorporated in polyester homopolymers, polyester copolymers and to mixtures of the homopolymers and copolymers. Specific examples of each class are:

POLYESTER HOMOPOLYMERS

Poly(ethylene terephthalate)
Poly(ethylene phthalate)
Poly(ethylene isophthalate)
Poly(butylene terephthalate)
Poly(butylene phthalate)
Poly(butylene isophthalate)
Poly(diethylene terephthalate)
Poly(propylene terephthalate)
Poly(1,4-butylene adipate)
Poly(ethylene adipate)
Poly(1,3-butylene sebacate)
Poly(ethylene maleate)
Poly(ethylene fumarate)
Poly(butylene maleate)
Poly(ethylene succinate)
Poly(hexafluoropentamethylene)isophthalate;

POLYESTER COPOLYMERS

Poly(ethylene propylene terephthalate)
Poly(ethylene butylene terephthalate)
Poly(ethylene propylene isophthalate)
Poly(ethylene butylene isophthalate)
Poly(ethylene butylene phthalate)
Poly(ethylene propylene phthalate)
Poly(ethylene terephthalate-isophthalate)
Poly(ethylene terephthalate-phthalate)
Poly(butylene terephthalate-isophthalate)
Poly(ethylene maleate-fumarate)
Poly(butylene maleate-fumarate)
Poly(ethylene maleate-succinate)
Poly(ethylene-propylene succinate)
Poly(ethylene-butylene succinate)
Poly(ethylene maleate-phthalate); and

POLYESTER MIXED HOMO AND COPOLYMERS

Poly(ethylene terephthalate)-poly(ethylene phthalate)
Poly(ethylene terephthalate)-poly(ethylene isophthalate)
Poly(ethylene terephthalate)-poly(butylene terephthalate)
Poly(ethylene terephthalate)-poly(butylene isophthalate)
Poly(ethylene terephthalate)-poly(butylene phthalate)
Poly(ethylene terephthalate)-poly(diethylene terephthalate)
Poly(ethylene terephthalate)-poly(didethylene isophthalate)
Poly(ethylene terephthalate)-poly(diethylene phthalate)

Poly(ethylene terephthalate)-poly(propylene terephthalate)
Poly(ethylene terephthalate)-poly(propylene isophthalate)
Poly(ethylene terephthalate)-poly(propylene phthalate)
Poly(ethylene terephthalate)-poly(ethylene succinate)
Poly(ethylene terephthalate)-poly(ethylene maleate)
Poly(ethylene terephthalate)-poly(ethylene fumarate)
Poly(ethylene terephthalate)-poly(1,4-butylene sebacate)

Polyesters having both ester and unsaturated repeat groups such as derived by reacting a mixture of maleic anhydride with phthalic anhydride in the presence of a diol such as ethylene glycol or a triol such as glycerin can also be treated with the flame retardant additives of my invention. These unsaturated polyesters can be reacted with vinyl compounds such as styrene or furfuryl alcohol to give thermosetting resins.

The preferred polyester from a commercial standpoint for use in my invention is polyethylene terephthalate which can be made from dimethyl terephthalate and ethylene glycol. Polyethylene terephthalate and other polyesters can be made into films, sheets, molded and extruded shapes or they can be spun into polyester fiber and thereafter made into fabric and clothing.

The poly(metal phosphinate)s are also useful as flame retardants for polyamides.

Polyamides useful in the practice of this invention include those which are well-known in the art as exemplified by U.S. Pat. Nos. 2,071,253; 2,130,523; 2,130,948; 3,213,066; 3,249,590; 3,250,750; 3,251,799; 3,350,364; 3,475,387; 3,489,726; 3,489,724; Belg. Pat. Nos. 614,387; 615,856 and those compositions described in the chapter on polyamides in the text; S. R. Sandler and W. Karo, *Polymer Syntheses*-Vol. I, Academic Press, Inc., New York, 1974. These references to the polyamides, their preparation and properties are incorporated herein by reference.

Examples of polyamides which can be flame retarded with the poly(metal phosphinate)s are: *Polyamides Homopolymers* - Poly($\epsilon$-caproamide) [NYLON 6], poly (hexamethylene adipamide)[NYLON 6.6], poly (hexamethylenesebacamide)[NYLON6, 10], poly (m-phenylene isophthalamide), poly (m-xylylene adipamide); *Polyamides Copolymers* - Poly (hexamethylene-p-phenylene adipamide) poly (hexamethylene-p-phenylene dipropionamide) and *Polyamide Mixed Homo and Copolymers*-poly ($\epsilon$-caproamide) and poly (hexamethylene adipamide); poly (hexamethylene sebacamide) and poly-($\epsilon$-caproamide).

The preferred polyamides from a commercial standpoint are poly ($\epsilon$-Caproamide) sold under the tradename NYLON 6 and poly (hexamethylene adipamide) sold under the tradename NYLON 6.6. NYLON 6 is a polymer of caprolactam. NYLON 6.6 is a condensation product of adipic acid and hexamethylenediamine.

Mixed polyester-polyamides can also be flame retarded with the poly(metal phosphinate)s in my invention. Descriptions of these mixed polymers may be found in U.S. Pat. Nos. 2,901,466 and 3,475,385 which are incorporated herein by reference. Examples of mixed polyester-polyamides useful in my invention are:
Poly(ethylene terephthalate-terephthalamide)
Poly(ethylene terephthalate-phthalamide)
Poly(ethylene terephthalate-isophthalamide)
Poly(ethylene succinate-succinamide)
Poly(butylene terephthalate-terephthalamide)
Poly(propylene terephthalate-terephthalamide)
Poly(hexamethylene adipate-adipamide)
Poly(hexamethylene maleate-maleamide)
Poly(propylene isophthalate-isophthalamide)
Poly(propylene phthalate-phthalamide)

The polyesters, polyamides and mixed polyester-polyamides are treated with the flame retardant additives of my invention in any convenient manner as is well known in the art. The poly(metal phosphinate)s flame retardant additive may be incorporated at any convenient stage of the manufacture of the resins. For example the poly(metal phosphinate)s may be added to the polycondensation process in which case they become a part of the polymer structure itself. Additionally, the flame retardant additive may be mixed with a finished polyester or polyamide liquid or granulate and the mixture is then processed directly in molding or extruding machines. Alternatively, the mixture can first be melted as in an extruder, then granulated and finally processed into a molded article. A convenient way of incorporating the flame retardant additive with the resins is to mix them in a blending apparatus prior to extrusion or spinning.

The poly(metal phosphinate)s flame retardant additives are incorporated with the resins in an amount which will make the resins more difficult to ignite by a heat source than the same resins without the poly(metal phosphinate)s. This amount of poly(metal phosphinate)s will hereinafter be used in the specification and claims as the "flame retardant amount". Generally this "flame retardant amount" will range from 0.25 to about 30 parts by weight for each 100 parts by weight of resin. However, greater amounts may be used if desired. A preferred flame retardant amount of poly(metal phosphinate)s is 2.5 to 20 parts by weight per 100 parts by weight of polyester, polyamide or polyester polyamide. The "flame retardant amount" will vary from one to another of the particular poly(metal phosphinate)s used and will vary to some extent also with the particular resin in which the poly(metal phosphinate)s are added. I have also discovered that incorporating the poly(metal phosphinate)s in the polyesters and polyamides in an amount which will give a phosphorous content in the mixture of metal phosphinate and resin of at least one percent will provide good flame retardancy to the resins.

The following examples will illustrate the best mode of practicing my invention.

EXAMPLES 1–15

The poly(metal phosphinate)s flame retardants identified in Tables 1 and 2 (below) were mixed with polyester or polyamide resin powder using a Waring blender. The samples were pressed at 290° C. for three (3) minutes in a mold having 0.010" No. 236 Owens-Corning Fiberglas fabric on each side of the sample. The fabric is used as a fibrous reinforcing filler to prevent drip formation in the limiting oxygen index (LOI) determination in accordance with ASTM Method D2863-70). The LOI is a measure of flammability and provides a measure of the minimal volume fraction of oxygen in a slowly rising gaseous atmosphere capable of sustaining candlelike burning of the sample. A good measure of the effectiveness of a flame retardant additive can be obtained by noting the increase in the LOI value of the sample over that of the control containing no flame retardant. This increase is referred to as the Δ LOI in Table 1 and represents the average of two or more values.

Examples one through eight in Table 1 show the incorporation of the poly(metal phosphinate)s in polyesters derived from poly(ethylene terephthalate).

In the same manner as described above 10 parts of $Zn[(CH_3)(C_6H_5PO_2)]_2$ may be incorporated in 100 parts of poly(ethylene isophthalate), 30 parts of $Mg[(CH_3)(C_6H_5PO_2)]_2$ may be incorporated with 100 parts of poly(ethylene maleate-phthalate), Table 1

| Example | Flame Retardant Additive (Monomer Shown) | Loading (pph) | %P | LOI | ΔLOI |
|---|---|---|---|---|---|
| 1 | None | 0 | 0 | 23.5 | — |
| 2 | $Zr(OH)_2[(CH_3)(C_6H_5)PO_2]_2$ | 10 | 1.4 | 24.3 | 0.8 |
| 3 | $Zr(OH)_2[(CH_3)(C_6H_5)PO_2]_2$ | 20 | 2.85 | 24.3 | 0.8 |
| 4 | $Zn[(CH_3)(C_6H_5)PO_2]_2$ | 10 | 1.65 | 27.4 | 3.9 |
| 5 | $Zn[(CH_3)(C_6H_5)PO_2]_2$ | 20 | 3.3 | 27.9 | 4.4 |
| 6 | $Zn[(C_6H_5)_2PO_2]_2$ | 10 | 1.24 | 24.6 | 1.1 |
| 7 | $Zn[(C_4H_9)_2PO_2]_2$ | 10 | 1.17 | 24.6 | 1.1 |
| 8 | $Zn[(C_8H_{12})_2PO_2]_2]_x$ | 20 | 2.34 | 25.2 | 1.7 | and 5 parts of $Mn[C_6H_5)_2PO_2)]_2$ may be incorporated with 100 parts poly(butylene terephthalate) to produce flame retardant polyester resins.

Using the same procedure as in Examples one through eight, the flame retardant properties of the poly(metal phosphinate)s in NYLON-6 polyamide are shown in Examples nine to fifteen of Table 2.

In the same manner 10 parts of $Mg[(C_6H_5)_2PO_2]_2$ may be incorporated in 100 parts of Nylon 6.6, 30 parts of $Mn[(CH_3)C_6H_5PO_2]_2$ may be incorporated in 100 parts of poly(m-phenylene isophthalamide), 5 parts of $Sn[(CH_3)(C_6H_5)PO_2]_2$ may be incorporated in 100 parts of poly(hexamethylene sebacamide) to produce flame retarded polyamide resins.

Table 2

| Ex. | Flame Retardant Additive (Monomer Shown) | Loading (pph) | %P | LOI | Δ LOI |
|---|---|---|---|---|---|
| 9 | None | 0 | 0 | 21.3 | — |
| 10 | $Zn[(CH_3)(C_6H_5)PO_2)]_2$ | 10 | 1.65 | 22.4 | 1.1 |
| 11 | $Zn[(CH_3)(C_6H_5)PO_2)]_2$ | 20 | 3.3 | 24.6 | 2.3 |
| 12 | $Zn[(C_6H_5)_2PO_2)]_2$ | 10 | 1.24 | 21.2 | 0 |
| 13 | $Zn[(C_6H_5)_2PO_2)]_2$ | 20 | 2.48 | 22.8 | 1.5 |
| 14 | $[Zn[(C_4H_9)_2PO_2)_2]$- | 10 | 1.17 | 22.3 | 1.0 |
| 15 | $Zn[(C_8H_{17})_2PO_2)_2]_x]$ | 20 | 2.34 | 22.4 | 1.1 |

EXAMPLE 16

Polyester Containing Zinc Bis(hydroxymethyl) phosphinate

In a resin-flask with a stirrer was added 97g (0.5 mole) of dimethyl terephthalate and 90g (1.5 mole) of ethylene glycol under nitrogen. Then 0.45g zinc acetate was added and the mixture stirred for 1½–2 hours up to 175°–200° C. at which point no more methanol distilled over. The reaction mixture was cooled slightly and under nitrogen 5.0g of zinc bis(hydroxymethyl) phosphate was added. The temperature is raised to 275° C. while maintaining reduced pressure at 200 torr and gradually reducing it to 1.0 torr. The condensation was continued for 1-2 hours and the resulting white polyester contained about 1% phosphorus. The polyester (on molding into plates as per Examples 1–15) is self extinguishing.

This polyester-additive composition is suitable for the manufacture of sheets and fibers or molded parts where flame retardancy is desired.

EXAMPLE 17

Unsaturated Polyester Containing Zinc Bis(hydroxymethyl) phosphinate

To a resin-flask containing 98g (1.0 mole) of maleic anhydride and 68.4g (0.9 mole) of propylene glycol was added 31.0g (0.1 mole) of zinc bis(hydroxymethyl)phosphinate. The condensation was allowed to proceed at 205° C. for 8 hours under a blanket of nitrogen to give a self extinguishing resin (approx. 180g).

This resin (70g) can be reacted with styrene (30g) and furfural alcohol (25g) using 1% benzoyl peroxide to give a crosslinked polyester (solidifies in 11 hours). The resin can be further cured at 135° C. for 1 hour to give a tough hard flame retardant plastic product.

EXAMPLE 18

Preparation of the Zinc Salt of Bis(hydroxymethyl)phosphinic acid

To 26.7g (0.22 mole) of bis(hydroxymethyl)phosphinic acid dissolved in a solution of 400 ml of absolute ethanol and 400 ml of water was added 24.2g (0.11 mole) of zinc acetate dihydrate. The solution became milky and a white precipitate formed. Filtration and concentration of the filtrate followed by drying gave 29.5g (86%) of the white product, m.p. 254°–258° C. The elemental analysis is consistent with the structure:

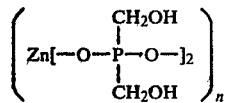

EXAMPLE 19

Preparation of Bis(hydroxymethyl)phosphinic acid

To 2kg sodium hypophosphite was added 11 liters of water, 4 liters of concentrated hydrochloric acid and 1.3kg paraformaldehyde. The mixture was heated under reflux for 50 hours and then concentrated under reduced pressure to remove water, hydrochloric acid and formaldehyde. On concentration sodium chloride precipitates out and was filtered. To complete the removal of hydrochloric acid and formaldehyde the mixture was diluted one-half with water and concentrated again under reduced pressure. This process was repeated several times before the odor of formaldehyde disappeared. The final syrup was concentrated at a bath temperature of 100° C. at 10mm Hg to give 2kg (90–95%) of a viscous light-yellow syrup. This acid may be reacted with a zinc salt to prepare poly(metal phosphinate)s as shown in Example 18. Other preparations of this acid, or its sodium salt, are described in U.S. Pat. Nos. 3,513,113 and 3,776,953 starting with white phorphorus and paraformaldehyde in methanol solution containing sodium hydroxide.

The flame retarding poly(metal phosphinate)s may be incorporated in the polyesters, polyamides, or mixed polyester-polyamides as the sole additive, or they may be incorporated in the resins along with conventional additives such as dyes, fillers, pigments and plasticizers.

I claim:

1. The flame retarded resin compositions comprising a polyester-polyamide and a flame retardant amount namely 2.5 to 20 parts by weight per 100 parts by weight of polyester-polyamide, of at least one poly(metal phosphinate)s having one, two, three or four phosphinate groups per coordination center and selected from the respective formulae:

(a) MX, MaX, Ma$_2$X, Ma$_3$X, M(AA)X, M(AA)$_2$X,
   (b) MX$_2$, MaX$_2$, Ma$_2$X$_2$, MabX$_2$, M(AA)X$_2$,
   (c) MX$_3$, MaX$_3$, Ma$_2$X$_3$, MabX$_3$, M(AA)X$_3$ or
   (d) MX$_4$ wherein
   M is a metal selected from the group consisting of beryllium, magnesium, calcium, strontium, barium, titanium, zirconium, antimony, bismuth, chromium, molybdenum, tungsten, manganese, iron, ruthenium, cobalt, rhodium, iridium, nickel, palladium, platinum, copper, silver, zinc, cadmium, mercury, aluminum, tin, lead and mixtures thereof;
   X is a disubstituted phosphinate group having the structure

wherein
   R and R$_1$ are independently selected from the group consisting of an aliphatic group of 1 to 20 carbons, a cycloaliphatic group of 3 to 20 carbons, an aromatic group of 6 to 12 carbons and said aliphatic, cycloaliphatic or aromatic groups can have substituted groups thereon, the substituted group being selected from the class consisting of a halogen, ether, hydroxyl, alkoxyl, ketone and ester;
   a and b are independent unidentate groups selected from the class consisting of oxy, alkoxy, hydroxyl and halide; and
   AA is a bidentate ligand selected from the group consisting of acetylacetonate, picolinate, 8-hydroxyquinolinate, dimethylglyoximate and glycinate.

2. The flame retarded composition of claim 1 in which the poly(metal phosphinate) is Zn[C$_6$H$_5$)(CH$_3$)PO$_2$]$_2$.

3. The flame retarded composition of claim 1 wherein M is selected from the group consisting of copper, iron, tin, cobalt, tungsten, manganese, chromium, vanadium, titanium, zinc, cadmium, molybdenum and the phosphinic acid

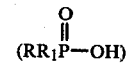

used to make the poly (metal phosphinate)s is selected from the group consisting of dibutylphosphinic acid, dioctylphosphinic acid, diphenylphosphinic acid, methylphenylphosphinic acid and phenylhydroxymethylphosphinic acid, bis(hydroxymethyl)phosphinic acid, and bis(hydroxyethyl)phosphinic acid.

4. The flame retarded composition of claim 1 in which the polyester-polyamide is Poly(ethylene terephthalate-terephthalamide).

5. The flame retarded composition of claim 1 in which the polyester-polyamide is Poly(butylene terephthalate-terephthalamide).

6. The flame retarded composition of claim 1 in which the polyester-polyamide is Poly(hexamethylene adipate-adipamide).

7. A process of preparing flame retarded polyester-polyamide resins comprising incorporating with the said resins a flame retardant amount, namely 2.5 to 20 parts by weight per 100 parts by weight of polyester-polyamide of at least one poly(metal phosphinate)s having one, two, three or four phosphinate groups per coordination center and selected from the respective formulae:

(A) MX, MaX, Ma$_2$X, Ma$_3$X, M(AA)X, M(AA)$_2$X,
   (b) MX$_2$, MaX$_2$, Ma$_2$X$_2$, MabX$_2$, M(AA)X$_2$,
   (c) MX$_3$, MaX$_3$, Ma$_2$X$_3$, MabX$_3$, M(AA)X$_3$ or
   (d) MX$_4$ wherein
   M is a metal selected from the group consisting of beryllium, magnesium, calcium, strontium, barium, titanium, zirconium, antimony, bismuth, chromium, molybdenum, tungsten, manganese, iron, ruthenium, cobalt, rhodium, iridium, nickel, palladium, platinum, copper, silver, zinc, cadmium, mercury, aluminum, tin, lead and mixtures thereof;
   X is a disubstituted phosphinate group having the structure

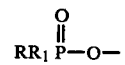

wherein
   R and R$_1$ are independently selected from the group consisting of an aliphatic group of 1 to 20 carbons, a cycloaliphatic group of 3 to 20 carbons, an aromatic group of 6 to 12 carbons and said aliphatic, cycloaliphatic or aromatic groups can have substituted groups thereon, the substituted group being selected from the class consisting of a halogen, ether, hydroxyl, alkoxyl, ketone and ester;
   a and b are independent unidentate groups selected from the class consisting of oxy, alkoxy, hydroxyl and halide; and
   AA is a bidentate ligand selected from the group consisting of acetylacetonate, picolinate, 8-hydroxyquinolinate, dimethylglyoximate and glycinate.

8. The flame retarded compositions of claim 1 processed in the form of films, sheets, filaments, fibers and molded or extruded articles.

* * * * *

Disclaimer 4,208,322.—*Stanley Robert Sandler*, Springfield, Del. POLYESTER POLYAMIDE RESINS FLAME RETARDED BY POLY(METAL PHOSPHINATE)S. Patent dated June 17, 1980. Disclaimer filed Aug. 20, 1981, by the assignee, *Pennwalt Corp.*

Hereby enters this disclaimer to all of the claims of said patent.

[*Official Gazette November 17, 1981.*]